No. 616,408. Patented Dec. 20, 1898.
E. COURTWRIGHT.
BICYCLE DRIVING GEAR.
(Application filed Sept. 9, 1896.)
(No Model.)
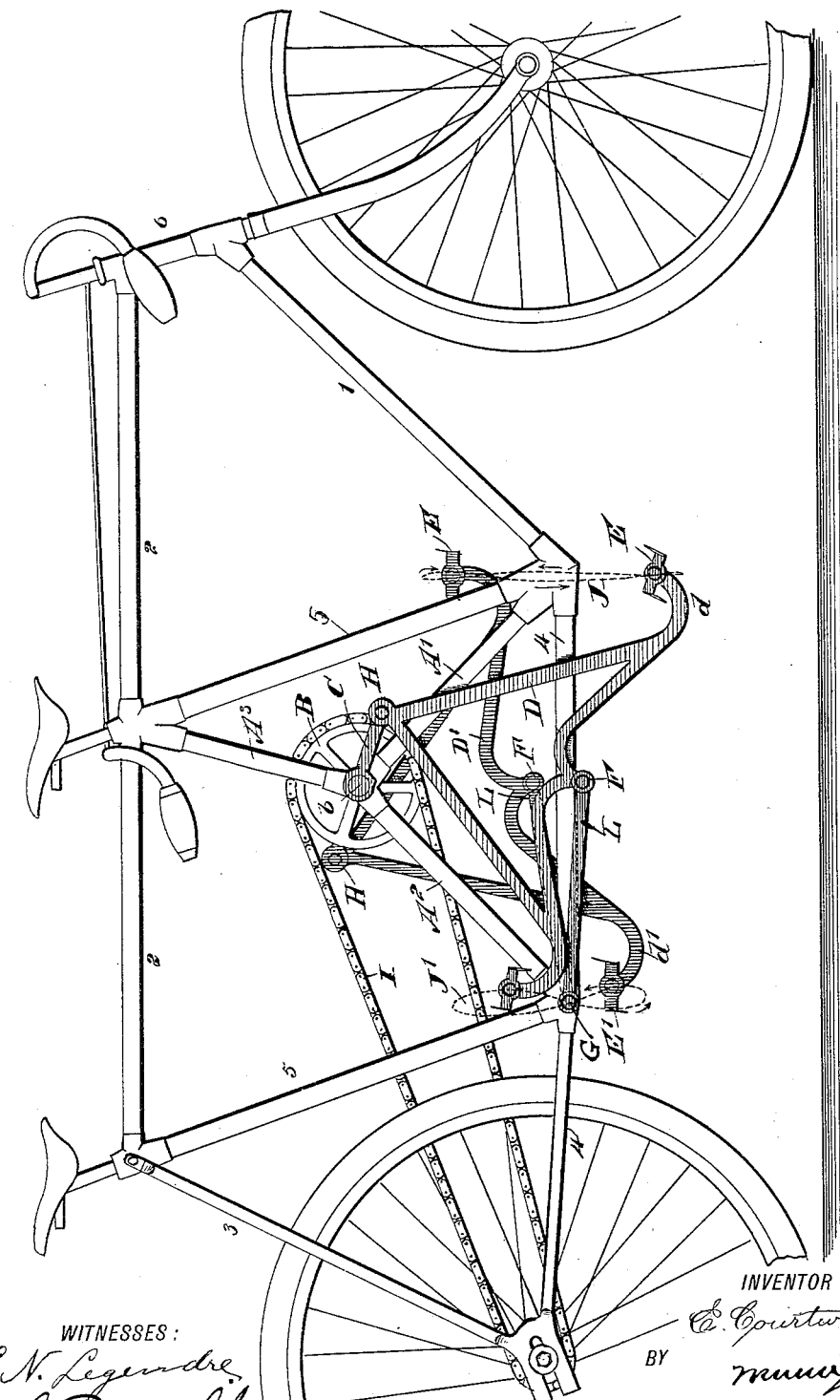
WITNESSES:
L. N. Legendre
H. L. Reynolds
INVENTOR
E. Courtwright
BY
Munn
ATTORNEYS.
THE NORRIS PETERS CO., PHOTO-LITHO., WASHINGTON, D. C.

UNITED STATES PATENT OFFICE.

EDGAR COURTWRIGHT, OF TACOMA, WASHINGTON.

BICYCLE DRIVING-GEAR.

SPECIFICATION forming part of Letters Patent No. 616,408, dated December 20, 1898.

Application filed September 9, 1896. Serial No. 605,263. (No model.)

*To all whom it may concern:*

Be it known that I, EDGAR COURTWRIGHT, of Tacoma, in the county of Pierce and State of Washington, have invented a new and Improved Bicycle Driving-Gear, of which the following is a full, clear, and exact description.

My invention relates to an improvement in driving-gears for tandem bicycles; and it consists of a combination of triangular levers to which the pedals are attached, with the usual sprocket driving gear and chain.

Reference is to be had to the accompanying drawing, forming a part of this specification, wherein a side elevation of a tandem bicycle having my improvement applied is shown.

The object of my invention is to provide a driving-gear which shall do away with the circular motion of the usual crank driving-gear and which will also do away with the second chain and its driving sprocket-gears.

The frame of the machine and the wheels and all such parts are the same as those ordinarily used, the frame consisting of the front inclined bar 1, horizontal top bar 2, rear inclined bar 3, horizontal bottom bar 4, saddle-posts 5, and steering-head 6. This frame is only modified by making a different support for the sprocket-wheel and crank-shaft.

Links L are pivoted at their rear ends to the backstays 4 of the machine at a point just forward of the rear wheel. These links L extend forward in a general horizontal direction and at their forward ends at F are pivoted to triangular levers D D'. Each of these levers is formed of three bars united to form the outline of a triangle, and at two angles of the triangle the bars are extended and curved up, as shown at $d$. At these points the pedals E are pivoted to the levers. The other angle H of the triangle is pivoted upon the crank C. The shaft $b$ of this crank is also the shaft of the sprocket-wheel B. This sprocket-wheel and the crank are similar in construction to the same parts of the usual driving mechanism, but are located higher than is usual.

The shaft $b$ is journaled in a bearing at the junction of the bars $A'$ $A^2$ $A^3$, arranged between the saddle-posts and the top and bottom bars of the frame. The sprocket-chain I, extending from the sprocket-wheel B to the rear driving-wheel, is of the usual construction. Upon each side of the wheel is placed one of the triangular-shaped levers with its pivot-link L.

In using my device the pedals will have a motion practically in a straight line, the actual path of the pedals being shown by the dotted line J, the arrows alongside thereof showing the direction of the motion. The point F of the lever D will have a motion in the arc of a circle with the pivot-point G for a center. The point H of the lever will describe a circle, while the pedal E will move over the course indicated by the dotted line J. By employing this mechanism the circular motion of the crank driving mechanism is modified so that it becomes practically a vertical straight-line motion at the pedals. It will also be seen that it does away with the second chain and its sprocket-wheels of the usual tandem driving-gear.

Having thus described my invention, I claim as new and desire to secure by Letters Patent—

1. In a driving-gear for tandem bicycles, the combination with the frame, the driving-wheel, the sprocket-wheel thereon, a sprocket-wheel mounted in the frame between the upper and lower portions thereof and provided with cranks at opposite sides, and a chain passing around said sprocket-wheels, of triangular levers each pivoted at one angle to one of the cranks of the sprocket-wheel and having extended and upwardly-curved portions at each of its other angles, pedals pivoted to said upwardly-curved portions of the levers, and links pivoted to the frame and to the triangular levers between the pedals thereof, substantially as described.

2. In a driving-gear for tandem bicycles, the combination with the frame provided with three bars in rear of the front saddle-post and meeting at a point about midway between the upper and lower bars of the frame, the drive-wheel and a sprocket-wheel thereon, of a sprocket-wheel mounted in the frame at the juncture of the said bars and having a crank at each end of its shaft, triangular levers each pivoted at one angle to one of the cranks of the sprocket-wheel and having extended and upwardly-curved portions at each of its other angles, pedals pivoted to said upwardly-curved portions of the levers, and links pivoted to the frame and to the triangular levers about midway between the pedals thereof, substantially as herein shown and described.

EDGAR COURTWRIGHT.

Witnesses:
CHARLES T. WYATT,
ED. O'KEEFE.